United States Patent
Naccache et al.

(10) Patent No.: US 12,229,772 B2
(45) Date of Patent: Feb. 18, 2025

(54) TRANSACTION AUTHENTICATION METHOD, SERVER AND SYSTEM USING TWO COMMUNICATION CHANNELS

(71) Applicant: BANKS AND ACQUIRERS INTERNATIONAL HOLDING, Paris (FR)

(72) Inventors: David Naccache, Paris (FR); Marc Beunardeau, Paris (FR); Aisling Connolly, Paris (FR); Rémi Geraud, Paris (FR); Hiba Koudoussi, Paris (FR)

(73) Assignee: BANKS AND ACQUIRERS INTERNATIONAL HOLDING (FR)

( * ) Notice: Subject to any disclaimer, the term of this patent is extended or adjusted under 35 U.S.C. 154(b) by 111 days.

(21) Appl. No.: 17/784,861

(22) PCT Filed: Dec. 11, 2020

(86) PCT No.: PCT/FR2020/052398
§ 371 (c)(1),
(2) Date: Jun. 13, 2022

(87) PCT Pub. No.: WO2021/116627
PCT Pub. Date: Jun. 17, 2021

(65) Prior Publication Data
US 2023/0009385 A1 Jan. 12, 2023

(30) Foreign Application Priority Data
Dec. 13, 2019 (FR) ........................................ 1914346

(51) Int. Cl.
*G06Q 20/40* (2012.01)
*G06Q 20/38* (2012.01)
*G06Q 40/02* (2023.01)

(52) U.S. Cl.
CPC ......... *G06Q 20/401* (2013.01); *G06Q 20/386* (2020.05); *G06Q 40/02* (2013.01)

(58) Field of Classification Search
None
See application file for complete search history.

(56) References Cited

U.S. PATENT DOCUMENTS

2007/0175978 A1* 8/2007 Stambaugh ............ G06Q 40/12
235/379
2011/0099377 A1 4/2011 Hoornaert et al.
(Continued)

FOREIGN PATENT DOCUMENTS

WO WO-02091144 A1 * 11/2002 ............. G06Q 20/04
WO WO-2005114886 A2 * 12/2005 ......... G06Q 20/3674

*Primary Examiner* — Paul S Schwarzenberg
(74) *Attorney, Agent, or Firm* — Dilworth IP, LLC

(57) ABSTRACT

A transaction method for a user using a first and a second terminal and connected to a server via a first and a second communication channel, respectively. The first terminal sends a transaction amount to the server. The server establishes a verification code whose length depends on the transaction amount, then sends a request to the first terminal and the verification code to the second terminal. The user returns the request filled in with a copied code to the server using the first terminal. The server compares the verification code with the copied code and sends a transaction validation or invalidation message to the first terminal depending on the comparison.

16 Claims, 4 Drawing Sheets

(56) References Cited

U.S. PATENT DOCUMENTS

2012/0173434 A1\* 7/2012 Mardikar ........... G06Q 20/3821
705/17
2015/0188913 A1 7/2015 Teixeron et al.
2022/0027919 A1\* 1/2022 Bermudez-Cisneros ...................
G06Q 20/401

\* cited by examiner

[Fig. 1]
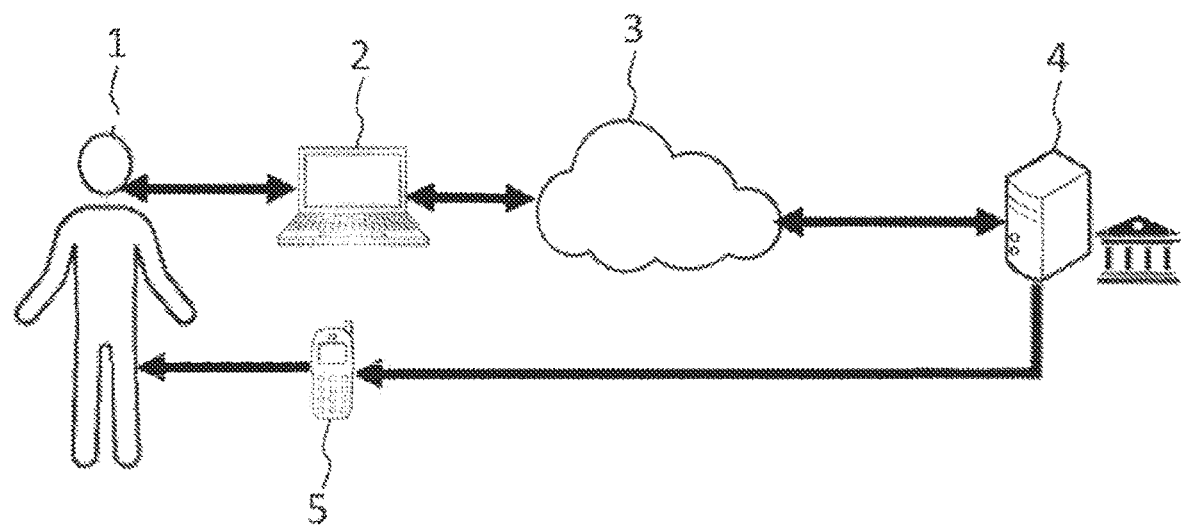
[Fig. 2]
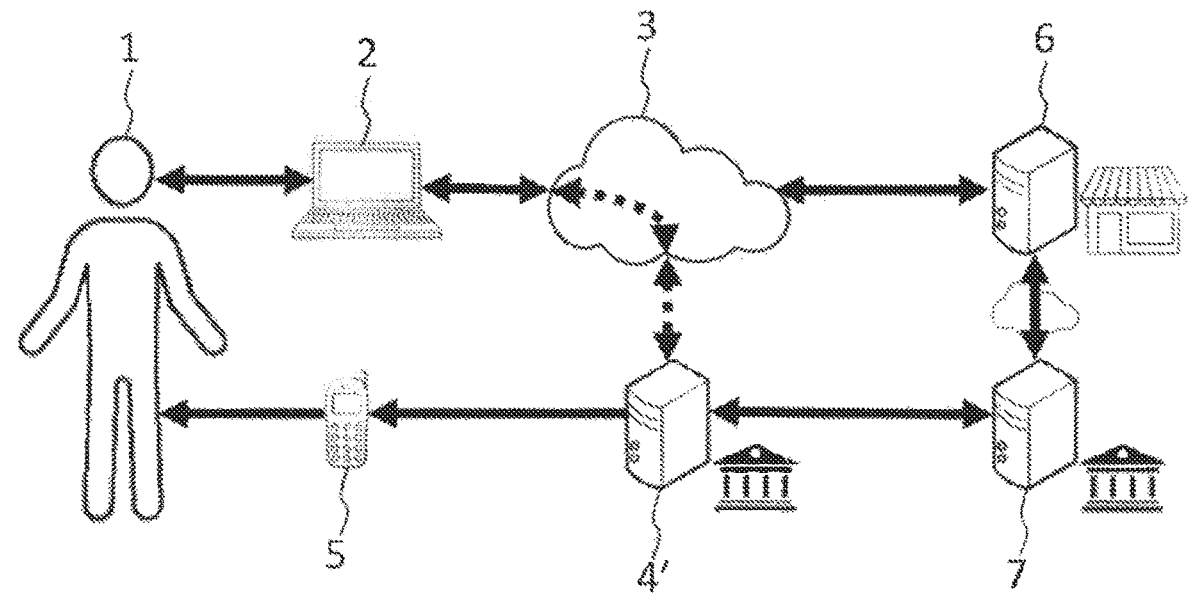

[Fig. 3]
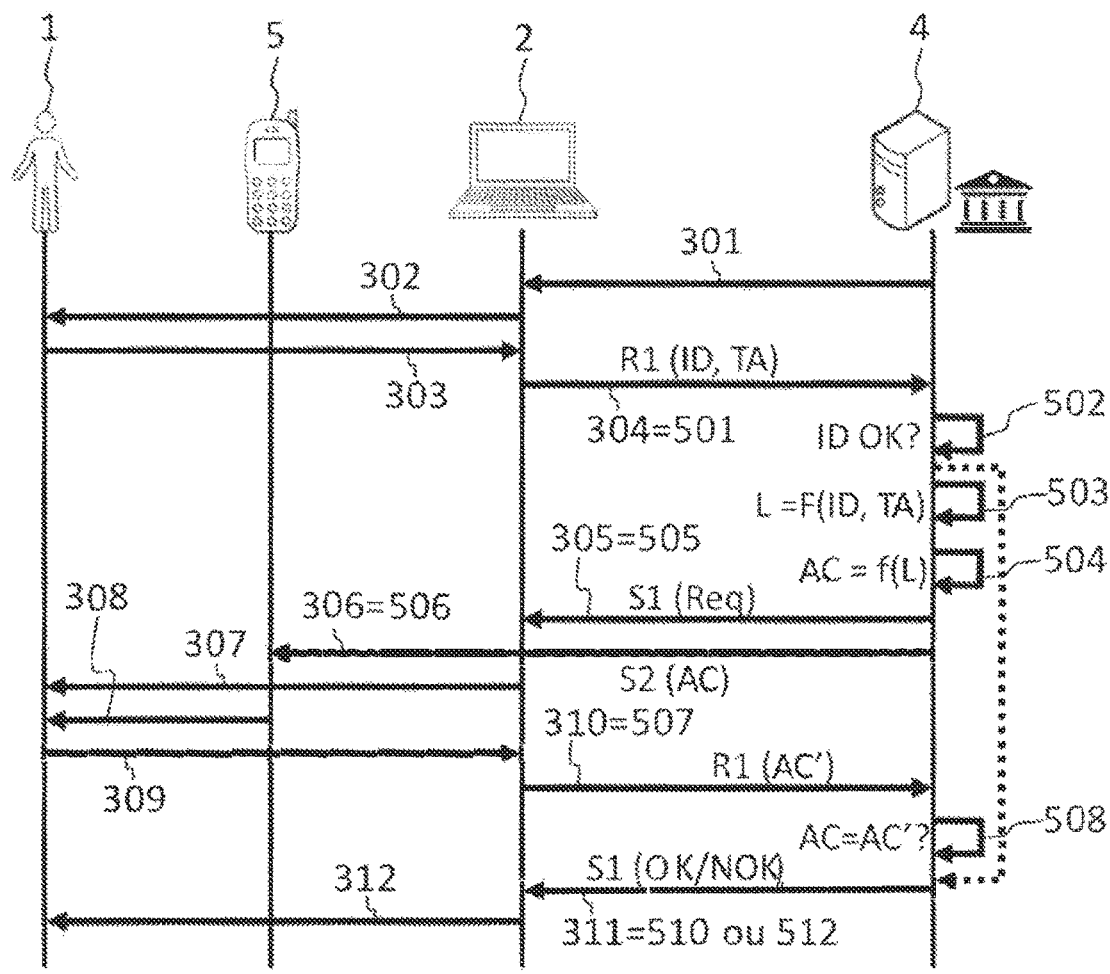

[Fig. 4]
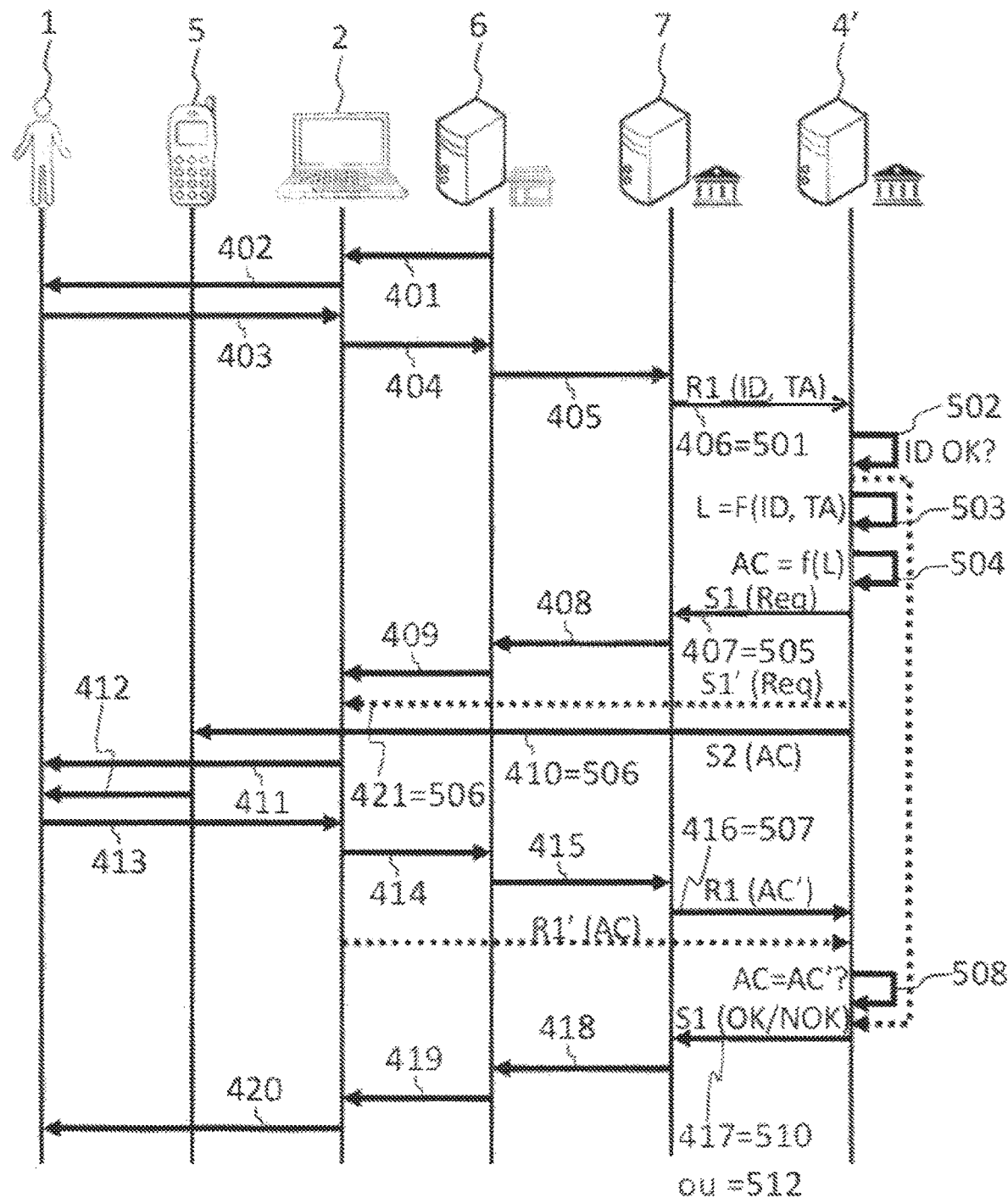

[Fig. 5]
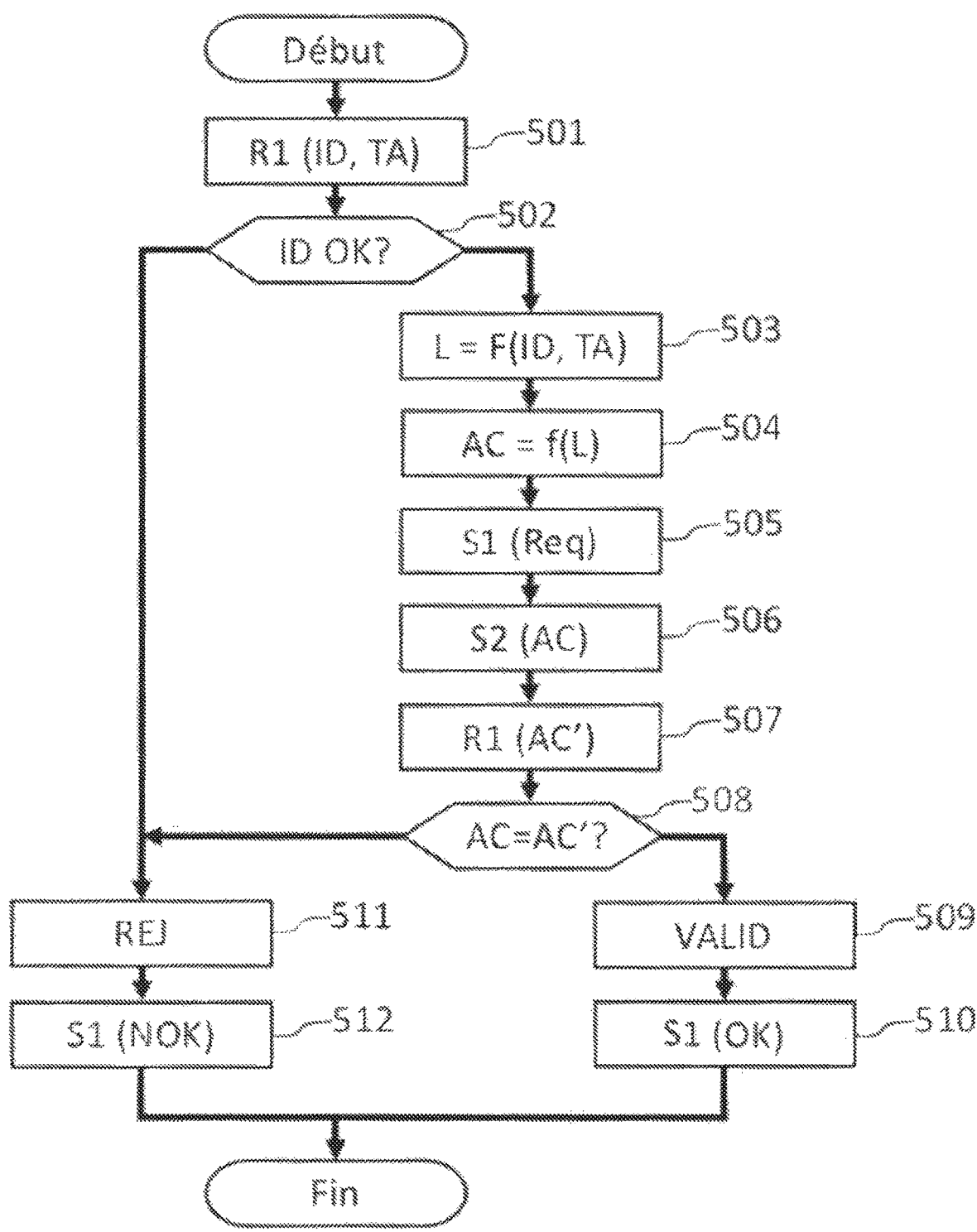

TRANSACTION AUTHENTICATION METHOD, SERVER AND SYSTEM USING TWO COMMUNICATION CHANNELS

TECHNICAL FIELD

The invention relates to a transaction authentication method using two communication channels as well as to a server and a bank transaction system implementing the method. More particularly, the invention relates to the use of a second communication channel to secure a transaction performed from a first communication channel.

TECHNOLOGICAL BACKGROUND

The electronic payment transactions described in this document relate to payment operations performed on line. An online payment is made when selling or purchasing goods or services, whether by businesses, households, individuals, governments or other public or private organisations, over interconnected networks of computers, such as for example the Internet. Goods and services are ordered over these networks, but payment and final delivery of the good or service can be made on line or off line. In addition, bank customers regularly perform bank transfer payment operations using Internet banking services. More and more consumers are using e-commerce, to find and purchase goods and services over electronic networks such as for example the Internet. Payment is generally made by entering a debit and/or credit card number, or bank card, or using other financial information in the respective fields of a form on the merchant's site on line. Transactions can also be made using online or mobile payment service providers, such as those proposed, for example, by PayPal, Inc., in San José, Calif. To ensure better security, electronic payment systems often use agglomerated security solutions such as those identified by the "3Dsecure", "Verified by Visa", or other brands. Such payment services and payment security solutions can make transactions easier and/or more secure for the parties involved. Buying with the help of a payment service provider from a portable mobile terminal is one of the main reasons why online and mobile purchases are developing so rapidly.

With traditional online payment systems, users are exposed to security risks. For example, typing numbers of a credit card ID into a field on an online payment form exposes a user to theft of this number by a third party looking at their screen, by a keylogging computer virus, etc. While the storage of credit card numbers by an online retailer may avoid requiring the user to manually enter information for each purchase during the payment transaction, it exposes the online retailer to their own security risks and responsibilities. Credit card information can also be captured by simple means, for example, by taking a photograph of a card exposed inadvertently, not to mention that credit cards can be lost or stolen, which allows a malicious person to misuse it.

Consequently, modern electronic payment systems, such as online banking operations and e-commerce, often use a so-called two-factor security authentication procedure, hereinafter referred to as 2FA, to authenticate securely a customer holder of a bank card during the payment transaction. Two-factor authentication procedures are well known to those skilled in the art. One of the oldest forms of two-factor security authentication, generally used by banks for Internet banking transactions, consists in issuing cardholder customers, together with the bank card, a numbered list of Transaction Authentication Numbers (TAN), so that after entering card information in a payment request form on a bank website, in a second step of the transaction, the bank asks the user to manually enter the TAN corresponding to a number chosen randomly by the bank from the TAN list.

The disadvantages and the limited security of the above-mentioned 2FA solution lead to more advanced forms of two-factor authentication procedures which may currently require that a customer has, in addition to the payment card and/or other customer identity information and a PIN (Personal Identification Number) code, a second personal device, registered by the payment system or by the bank with this customer, said personal device being used as the second customer authentication factor during payment transactions. Generally, such a device is a mobile phone or a secure token connected to the Internet or to another network and which is issued by the bank or any other payment solution provider. In the case of a 2FA procedure, during a payment transaction, a customer uses a device, generally compatible with the Internet, to select goods, services or other forms of payment transaction on the website of the merchant or of the online bank, and performs a first payment transaction step by filling in the forms provided by said websites with the payment information required, such as bank card and/or bank account number, cardholder name and address, etc. Once the form has been sent, a bank, payment solution provider, or credit card issuer sends a one-time transaction authentication code to a second device of the cardholder. In a second step, the authentication code is entered manually by the cardholder and then sent via the network to the bank, to the payment solution provider or to the credit card issuer, so that the code can be compared with the authentication code issued. If the comparison is correct, the payment operation will be successful, otherwise the payment transaction will be refused, possibly with notification to the cardholder.

Although this two-factor authentication procedure increases the overall security of electronic payment transactions, it also increases the transaction and shopping cart abandonment times. Entering the authentication code manually not only takes extra time, but more importantly, leads to the risk of errors, creating a bad user experience that can result in the transaction being abandoned at this stage.

An authentication code is generally an alphanumeric string of a given length. The length of the string is defined a priori by a payment scheme and is the same for all transactions. Currently, two-factor scheme implementations are faced with the following dilemma: either the authentication code is short, which is better for the user experience, but its security is poor because the short codes can easily be guessed; or the code is long, which is preferable for the security of the payment system, but increases the risk of error for the user.

This invention aims to remedy the above-mentioned inconveniences when using an authentication code in a two-factor security procedure.

SUMMARY OF THE INVENTION

The invention proposes to improve the above-mentioned two-factor authentication system by adapting the complexity of the authentication code, in particular its length, to the amount paid during the transaction.

According to one embodiment, the invention proposes a transaction authentication method using two data communication channels for a user using a first terminal connected to at least one bank transaction server via a first communication channel and a second terminal connected to the at least one bank transaction server via a second communication channel that is at least logically distinct from the first communication channel. The method comprises:

- a first step during which the first terminal sends to the at least one bank transaction server transaction information comprising at least a transaction amount, and an identification of a bank account and/or of a bank card to be debited,
- a second step during which the bank transaction server establishes a verification code whose length depends on the transaction amount, determines the second terminal according to the identification of the bank account and/or of the bank card to be debited, then sends, firstly, a confirmation request to the first terminal requesting the verification code via the first communication channel and, secondly, the verification code to the second terminal via the second communication channel,
- a third step during which the user copies the verification code received on the second terminal in the confirmation request received by the first terminal and returns said request thus filled in with the copied code to the bank transaction server using the first terminal via the first communication channel,
- a fourth step during which the bank transaction server receives the copied code from the first terminal, and compares the verification code with the copied code and sends to the first terminal a transaction validation message if the codes are identical or a transaction invalidation message if the codes are different.

Thus, the length of the verification code may increase when the transaction amount increases. Short authentication codes can be assigned to transactions involving small payment amounts, while longer and more complex codes, i.e. more difficult for malicious persons to guess, can be assigned to higher payment amounts. Preferably, the length of the verification code can be between a minimum value and a maximum value.

The user experience during electronic payment transactions is improved in two ways. Firstly, and especially for small amount transactions, the work of manually copying the authentication code from one peripheral to another is made easier, which is faster and reduces the risk of error for the user. For transactions involving larger sums, longer and more complex authentication codes allow the user to realise that authentication by the second factor, even if it makes the transaction more complex and longer, increases the security of the transaction, thereby reassuring the user.

As a variant, the transaction information may comprise the account holder identification information and at least one redundant item of information relating to the identification of the bank account to be debited. The second step may comprise a preliminary step which checks that the identification of the bank account to be debited matches the holder identification information and the at least one redundant item of information. The second step can only be performed if the match is successful.

Considering that a risk factor during the transaction may depend on parameters other than the transaction amount, the length of the verification code may also depend on a risk factor determined using one or more parameters selected from the transaction time, the transaction date, information relating to the cardholder, the number of transactions performed during a predetermined period preceding the transaction.

According to a second embodiment, the invention proposes a bank transaction server comprising a processing unit, a program memory, at least one communication interface capable of communicating via a first communication channel and via a second communication channel that is at least logically distinct from the first communication channel. The program memory comprises instructions cooperating with the processing unit so that the server is configured to:

after receiving from the first communication channel a transaction request comprising at least a transaction amount and an identification of a bank account to be debited, calculate a length of a verification code depending on the transaction amount, determine the verification code using the code length calculated, determine a second communication channel according to the identification of the bank account to be debited, send a confirmation request requesting the verification code via the first communication channel, and send the verification code via the second communication channel, after receiving a code received via the first communication channel in response to the confirmation request, compare said received code with the verification code and send via the first communication channel a transaction validation message if said codes are identical or a transaction invalidation message if said codes are different.

According to another embodiment, the invention proposes a bank transaction system comprising at least one bank transaction server, a first terminal of a user connected to the at least one bank transaction server via a first communication channel, and a second terminal of a bank account and/or bank card holder connected to the at least one bank transaction server via a second communication channel that is at least logically distinct from the first communication channel. The first terminal is configured to send, when requested by the user, to the at least one bank transaction server, a transaction request comprising at least a transaction amount and an identification of the bank account and/or of the bank card. The bank transaction server is configured to, after receiving the transaction request, establish a verification code whose length depends on the transaction amount, determine the second terminal according to the identification of the bank account to be debited, then send, firstly, a confirmation request requesting the verification code to the first terminal via the first communication channel and, secondly, the verification code to the second terminal via the second communication channel. The second terminal is configured to display, to the bank account holder, the verification code sent by the bank transaction server. The first terminal is configured to return to the bank transaction server a code copied by the user using the verification code displayed on the second terminal. The bank transaction server is configured to, after receiving the copied code, compare the verification code with the copied code and send to the first terminal a transaction validation message if the codes are identical or a transaction invalidation message if the codes are different.

BRIEF DESCRIPTION OF THE FIGURES

The invention will be easier to understand and other features and advantages will appear on reading the description below of particular embodiments of the invention, given for illustration and as a non-limiting examples, and referring to the attached drawings in which:

FIG. 1 shows a two-factor authentication bank transaction system,

FIG. 2 shows a two-factor authentication commercial transaction system on an open network, FIG. 3 illustrates a transaction on the system of FIG. 1 according to the invention, FIG. 4 illustrates a transaction on the system of FIG. 2 according to the invention, FIG. 5 shows a flowchart representing the operation of an authentication server according to the invention,

DETAILED DESCRIPTION

FIGS. 1 and 2 show two transaction systems performed via an open network, such as for example the Internet, using two-factor authentication. On these two figures, the same references correspond to the same elements or to similar elements. These two figures correspond to two-factor security transaction schemes as used in the prior art and according to the invention.

"Open network" means a communication network allowing interconnections between one or more computer machines accessible to any person wishing to do so. This type of network could be the Internet but could correspond to other types of network provided that the connection remains open to everyone. Open networks have the advantage of making it easier to connect people, thereby increasing the possibilities for commercial transactions between people connected to said network. A disadvantage of open networks is the risk of interacting with machines owned by malicious persons.

FIG. 1 corresponds to a bank transaction system allowing a user to perform transaction operations with their bank, such as for example to make a bank transfer or to purchase securities on line or any other type of operation for which the user transfers money from their bank account. On this FIG. 1, the user 1 interacts with a first terminal 2 connected to an open network 3, such as for example the Internet, in order to communicate with a banking service server 4 to perform an operation corresponding to a bank transaction, in other words a money transfer from a bank account.

The first terminal 2 is for example a desktop computer or a laptop, a tablet or a smartphone having a processing unit, at least one volatile and/or non-volatile memory, a communication interface allowing it to connect to the open network 3, a human-machine interface to view and enter information, such as for example a display screen, a touchscreen, a keyboard, a mouse or other. Amongst the programs stored in its memory, the first terminal has a program to navigate on the open network 3, allowing it to connect to and interact with websites, in particular to consult web pages or to fill in and send forms corresponding to transaction requests. Alternatively, the first terminal 2 can have a specific program allowing it to connect via the open network 3 to the banking service server 4.

The banking service server 4 is for example a computer having one or more processing units, at least one volatile and mass storage memory, and at least one communication interface allowing it to connect to the open network 3. The mass storage memory stores in particular a database containing all the information relating to the bank accounts of the customers of the bank to which they belong. The banking service server 4 comprises programs stored in memory allowing it to provide to connected terminals, via the open network 3, searchable web pages in order to interact with users via forms contained in said web pages. Once filled in and returned by the user, the forms are processed by the processing unit for validation.

When a user 1 wants to make transaction, they use the first terminal 2 to connect to the banking service server 4. A web page is then transmitted to the first terminal 2 by the banking service server 4. The web page may comprise information to be displayed on the first terminal 2, as well as commands to be executed depending on the choice made by the user via the human-machine interface. Amongst the choices offered to the user 1, a transaction, for example a bank transfer, can be made. If the user 1 chooses to make bank transfer, a transaction form is displayed, which can be included in the web page or transmitted by the banking service server 4 after receiving a message indicating the choice of the user 1 from the first terminal 2. The user 1 then fills in the form with the information required for the transaction, which may include the identification of the bank account to be credited, the identification of the bank account to be debited and the transaction amount. Numerous other items of information may also be required, such as redundant identifiers of the user and/or of the bank account or of its holder, a secret known only to the bank and the holder, a transaction identifier or any other information related to the transaction. After filling in the form, the user 1 sends the filled in form to the banking service server 4 via the first terminal 2. The form may be accompanied by the transmission date and time as well as identifiers specific to the first terminal 2.

After receiving the filled in transaction form, the banking service server 4 checks the information contained in the form and in particular whether or not the requested transaction can be authorised. The banking service server 4 therefore queries its database to check whether the account to be debited is still in service and whether the account to be debited has sufficient credit to authorise the transaction. Optionally, the server can check the accuracy of redundant identifiers or of information concerning the bank account holder. This first verification corresponds to a first security factor. However, the transaction was transmitted by the open network 3 and, despite this first verification, this transaction could come from a misappropriation of the form and/or information concerning the bank account by a malicious third party.

Communications on the open network 3 may in fact be intercepted and possibly reused after being modified. To guarantee a minimum level of security, it is known to encrypt the sensitive messages between two machines, such as for example the terminal 2 and the banking service server 4, using session keys or specific keys. However, any encrypted message can be decrypted after a certain period of time, making it possible to retrieve a form that has been exchanged and reuse the information it contains. In addition, the fact that the network is open allows malicious persons to spread viruses on the machines connected to it and in particular the first terminal 2. Some viruses can intercept the information exchanged on the human-machine interfaces and send it to another machine, thereby disabling the confidentiality of encrypted messages.

To add a security level, a second security factor can be added by using a second communication channel to send a one-time code. The banking service server 4 therefore has a second communication interface designed to communicate via the second communication channel with a second terminal 5 which belongs to a bank account holder. The second terminal 5 is identified in the database of the banking service server 4 in relation with the bank account to be debited. Traditionally, the second terminal 5 may be a mobile phone of the bank account holder, but may also be any other type of device connected to a communication network, such as for example a box connected to a mobile phone network supplied by the bank or even a tablet or a computer connected to the Internet. The most important is that the second communication channel should be at least logically distinct from the first communication channel used to send the transaction form.

After having made the first verification, the banking service server 4 retrieves, from its database, the identifier of the second terminal 5 to send it a one-time verification code. The identifier of the second terminal 5 is, for example, a mobile phone number and the message is, for example, sent by an SMS (Short Message Service). The message can also indicate the transaction amount and/or the transaction beneficiary, so that the account holder can check that the current transaction corresponds to a required transaction.

In parallel, the banking service server 4 sends to the first terminal 2 a confirmation request requesting the one-time code. If the user 1 corresponds to the bank account holder, they can read the one-time code on the second terminal 5 and copy it into a response form attached to the confirmation request in order to return it to the banking service server 4.

After receiving the response form, the banking service server 4 compares the code present in the form with the one-time code sent to the second terminal 5. If the two codes are identical, the banking service server 4 validates the transaction and sends a message to the first terminal 2 indicating that the transaction has been accepted. If the two codes are different, the transaction is refused and the banking service server 4 sends a message to the first terminal indicating that the transaction has been refused. Optionally, the banking service server 4 can send another new one-time verification code to the second terminal 5 and a new request to the first terminal 2.

FIG. 2 corresponds to a commercial transaction system allowing a user 1 to make a purchase on a merchant site 6. The merchant site 6 is a server-type computer which is connected to the open network 3 in order to provide web pages proposing products and/or services to users connecting to it using a suitable terminal. The user 1 connects to the merchant site 6 using the first terminal 2 via the open network 3. Once the user 1 has chosen products or services, the merchant site 6 sends a transaction form to the first terminal 2. The transaction form is pre-filled in by the merchant site 6 with the vendor's identification and bank account as well as the transaction amount. The transaction form is displayed to the user 1 by the first terminal 2, prompting the user to enter a bank account or bank card identification. Other information may also be required, such as for example the bank card supplier, the Cardholder Verification Value (CVV) code which is a redundant identifier of the card, the bank card holder identification or any other redundant information relating to the card or its holder. After filling in the form, the user 1 sends it to the merchant site 6 via the first terminal 2. The form may be accompanied by the transmission date and time as well as identifiers specific to the first terminal 2, such that for example its address on the open network 3.

The merchant site 6 receives the form and sends it to a purchaser service server 7 which corresponds to its bank. The purchaser service server 7 is a computer having one or more processing units, at least one volatile and mass storage memory, at least one communication interface allowing it to connect to the merchant site 6 and at least one communication interface to connect to a secure network dedicated to the banking services. The communication interface communicating with the merchant site 6 can correspond to a specific secure link or to an open network implementing encrypted communication.

The purchaser service server 7 then sends the transaction form, via the secure network, to a debtor service server 4' which corresponds to the bank card issuer. The debtor service server 4' is similar to the banking service server 4. The debtor service server 4' can be the cardholder's bank server or the server of a credit card issuer.

After receiving the transaction form, the debtor service server 4' checks the information contained in the form and in particular whether or not the requested transaction can be authorised. The debtor service server 4' therefore queries its database to check whether the bank account or the bank card is still in service, whether any redundant information matches the card or the bank account and whether the transaction amount corresponds to an authorised amount. After this first security level verification, the debtor service server 4' performs a verification according to a second security level similar to that described in relation to FIG. 1 with some differences.

The debtor service server 4' identifies in its database the second terminal 5 in relation to the bank card or the bank account to be debited and a second communication channel distinct, at least logically, from the communication channel communicating with the first terminal 2. The debtor service server 4' sends a message with a one-time verification code to the second terminal 5. The message can also indicate the transaction amount and/or the transaction beneficiary, so that the account holder can check that the current transaction corresponds to a required transaction.

In parallel, the debtor service server 4 sends to the first terminal 2 a confirmation request requesting the one-time code. This request can be sent to the first terminal 2 via the purchaser service server 7 and the merchant site 6 via the open network 3 or directly by the debtor service server 4' via the open network 3. If the user 1 corresponds to the bank card or bank account holder, they can read the one-time code on the second terminal 5 and copy it into a response form attached to the confirmation request in order to return it to the debtor service server 4' using the same communication channel.

After receiving the response form, the debtor service server 4' compares the code present in the form with the one-time code sent to the second terminal 5. If the two codes are identical, the banking service server 4 validates the transaction and sends a message to the purchaser service server 7 which stores the transaction and sends a validated payment message to the merchant site 6. The merchant site 6 then informs the first terminal 2 that the payment has been accepted and delivers the service or initiates a product delivery procedure which will not be detailed in this document. If the two codes are different, the transaction is refused and the debtor service server 4' sends a message to the purchaser service server 7 which is forwarded to the merchant site 6, then to the first terminal 2 indicating that the transaction has been refused and therefore not performed. Optionally, the debtor service server 4' can send another new one-time verification code to the second terminal 5 and a new request to the first terminal 2 via one of the paths indicated previously.

The invention aims to improve transaction verifications using two security factors as indicated previously and in particular using a second communication channel to communicate with the bank account or bank card holder. FIGS. 3 and 4 therefore illustrate steps of the transaction methods performed according to the invention respectively on the transaction systems described in relation with FIGS. 1 and 2. The flowchart of FIG. 5 details the steps of the transaction verification method performed according to the invention by the banking service server 4 or the debtor service server 4' during the exchanges made in accordance with FIG. 3 or FIG. 4. The common steps between FIGS. 3, 4 and 5 have the same references and FIG. 5 is described at the same time as FIGS. 3 and 4. In order to emphasise the invention, the steps performed before the user 1 chooses a transaction are not detailed on FIGS. 3 and 4 which start after a transaction decision, corresponding to making a payment, has been validated by the user 1 of the first terminal 2.

On FIG. 3, once the user 1 has chosen the transaction, the banking service server 4 sends to the first terminal 2 a transaction form corresponding to the choice of the user 1 in a first step 301 of the transaction method. In a second step 302 of the transaction method, the user 1 reads the form received by the first terminal 2, for example using a display screen of the first terminal 2. The user fills in the form with the information requested during a third step 303 of the transaction method, for example using a keyboard of the first terminal 2. After filling in the form, the user validates the form to send it.

A fourth step 304 of the transaction method corresponds to the first terminal 2 sending the form to the banking service server 4 via the open network 3. This fourth step 304 of the transaction method corresponds to a first verification step 501 of the banking service server 4. The banking service server 4 receives an incoming message R1 arriving via the first communication channel. The incoming message R1 contains information concerning a bank account identification ID and a transaction amount TA. The identification information ID includes at least the bank account number, but may include redundant information such as for example one or more elements selected from a password, a PIN code, one or more items of information concerning the identity of the bank account holder. The identification information ID may also include parameters specific to the transaction, such as for example the date and time or the location of the first terminal 2, as well as an identifier of said first terminal 2.

In a second verification step 502, the banking service server 4 checks that the bank account exists and that it is not blocked. Optionally, other verifications can be performed to make sure that any redundant information matches that corresponding to the bank account. In addition, the banking service server 4 may also check that the amount to be debited matches an authorised debit from the bank account.

After performing this preliminary bank account verification, the banking service server 4 then calculates a verification code length L in a third verification step 503 where the length L corresponds to a number of digits of said code. Preferably, the length L is determined according to the transaction amount TA, so that the verification code takes into account the transaction amount as a risk factor. As a simple example, the following formula can be used:

$$L = A*TA + B \qquad [\text{Math 1}]$$

The parameters A and B can be set arbitrarily by the bank according to a risk acceptance. If A=0.1 and B=2 with the result L rounded to the nearest integer, a payment of one euro will result in a code L of two digits very easy to copy for a sum representing a minimum risk. Using the same parameters, a payment of ten euros corresponds to a three-digit code and a payment of one hundred euros corresponds to a twelve-digit code.

Preferably, identification information ID can be taken into account when determining the number of digits. For example, the parameters A and B can be stored in the database of the bank service server 4 and accessed using the account number identification. Thus, the parameters A and B can be defined according to a risk accepted by the user or by their account manager, B corresponding to a minimum number of digits and A being determined according to an amount for which a financial risk seems acceptable. To avoid having codes that are too long, it is also possible to set a maximum number of digits.

As a variant, it is also possible to have a non-linear growth in the number of digits to avoid having to limit the number of digits. For example, the following formula can also be used:

$$L = A*\log_{10}(TA) + B \qquad [\text{Math 2}]$$

A logarithmic function can be used to obtain a growth of length L of the verification code that is proportional to the number of digits of the transaction amount. For example, if A=0.3 and B=3, an amount of less than ten euros produces a three-digit verification code, an amount of one hundred euros corresponds to a six-digit code and an amount of one thousand euros corresponds to a nine-digit code.

After determining the verification code length L, the banking service server 4 calculates a verification code AC during a fourth verification step 504. The verification code AC can be generated in different ways, preferably using a random or pseudo-random number generated by the processing unit of the banking service server 4. As a simple example, the following formula can be used to determine the verification code:

$$AC = \text{Seed} \bmod L \qquad [\text{Math 3}]$$

where Seed corresponds to a random or pseudo-random number generated by the processing unit of the banking service server 4, mod to the modulo function and L to the code length calculated during the third verification step 503. Numerous variants are possible by including the transaction amount TA and one or more items of transaction identification information ID, such as for example the transaction date or time. For example, the following formula can also be used:

$$AC = H(\text{Seed}, TA, ID) \bmod L \qquad [\text{Math 4}]$$

where H corresponds to a cryptographic hash function, for example a SHA-3 performed on the concatenation of the random number Seed, the transaction amount TA and one or more items of identification information ID.

After calculating the verification code AC, a fifth verification step 505 is performed by the banking service server 4. The fifth verification step 505 consists in sending an outgoing message S1, via the first communication channel, to the first terminal 2, the outgoing message containing a request Req asking the user 1 of the first terminal 2 to return a verification code in a response form.

In parallel with the fifth verification step 505, in other words before or after this fifth step 505, the banking service server 4 performs a sixth verification step 506. The sixth verification step 506 consists in sending an outgoing message S2 via the second communication channel to the second terminal 5. Prior to sending, the second terminal 5 is identified in the database of the banking service server 4 in relation with the bank account to be debited. The outgoing message S2 contains the verification code AC calculated during the fourth verification step.

The fifth verification step 505 corresponds to a fifth step 305 of the transaction method and the sixth verification step 506 corresponds to a sixth step 306 of the transaction method.

Once the request Req has been received by the first terminal 2, it is displayed to the user 1 during a seventh step 307 of the transaction method, and the user 1 must fill in the response form. In parallel with the seventh step 307, in other words before or after this seventh step 307, an eighth step 308 of the transaction method consists in displaying the verification code AC on the second terminal 5 to the user 1.

The user 1, having the verification code AC, fills in the response form by copying the verification code AC into the form during a ninth step 309 of the transaction method. The copied verification code AC' is sent to the banking service server 4 in a tenth step 310 of the transaction method. The tenth step 310 of the transaction method corresponds to a seventh verification step 507 performed by the banking service server 4. The banking service server 4 receives an incoming message R1 arriving via the first communication channel containing the copied code AC'. An eighth verification step 508 then consists in comparing the copied code AC' with the verification code AC calculated during the fourth verification step 504.

If the copied verification code AC' is identical to the verification code AC, the banking service server 4 performs a ninth verification step 509 during which it validates and saves the execution of the transaction. Then, a tenth verification step 510 is performed to send an outgoing message S1 via the first communication channel to the first terminal 2 to indicate that the transaction has been performed.

If the copied verification code AC' is not identical to the verification code AC, the banking service server 4 performs an eleventh step 511 during which it cancels the transaction. If, during the second verification step 502, the banking service server 4 has not found the bank account or has found the bank account but it is blocked, or if other verifications have shown that some redundant information does not match that corresponding to the bank account, the second verification step 502 can lead directly to the eleventh verification step 511 and also cancel the transaction. After the eleventh verification step 511, a twelfth verification step 512 is performed to send an outgoing message S1 via the first communication channel to the first terminal 2 to indicate that the transaction has been cancelled.

The tenth verification step 510 or the twelfth verification step 512 corresponds to an eleventh step 311 of the transaction method in which the first terminal 2 receives the outgoing message S1 to display it to the user 1 during a twelfth step 312 of the transaction method. Thus, the user 1 is informed that the requested transaction has been performed or cancelled.

FIG. 4 discloses a transaction method performed from the merchant site 6. Once the user has chosen to make a purchase, the merchant site 6 sends to the first terminal 2 a transaction form in a first step 401 of the transaction method. In a second step 402 of the transaction method, the user 1 reads the form received by the first terminal 2. The user 1 fills in the form with the information requested during a third step 403 of the transaction method. The form contains information concerning a bank card or bank account identification ID and a transaction amount TA. The identification information ID includes at least the bank card or bank account number, but may include redundant information such as for example one or more elements selected from a password, a PIN code, a CVV code, one or more items of information concerning the identity of the account holder. The identification information ID may also include parameters specific to the transaction, such as for example the date, time or location of the first terminal 2, or an identifier of said first terminal 2. After filling in the form, the user 1 validates the form to send it.

A fourth step 404 of the transaction method corresponds to the first terminal 2 sending the form to the merchant site 6 via the open network 3. The merchant site 6 then forwards the form to the purchaser service server 7 during a fifth step 405 of the transaction method. Using the bank card or bank account identification information ID, the purchaser service server 7 determines a corresponding debtor service server 4', to forward the form to it during a sixth step 406 of the transaction method.

This sixth step 406 of the transaction method corresponds to the first verification step 501, performed by the debtor service server 4', corresponding to the reception of the incoming message R1 arriving from the first communication channel. The debtor service server 4' then performs the second verification step 502, to check that the bank account or the bank card exists and that it is not blocked. Optionally, other verifications can be performed to make sure that any redundant information matches that corresponding to the bank account or the bank card. In addition, the debtor service server 4' may also check that the amount to be debited matches an authorised debit from the bank account or bank card.

The debtor service server 4' performs the third verification step 503 and calculates a length L of verification code AC corresponding to a number of digits of said code. The length L is determined according to the transaction amount TA, so that the verification code AC takes into account the transaction amount as a risk factor, as described previously.

In addition, since the transaction is performed on a merchant site and not on a bank server, the risk is greater. The length L of the verification code may also include other risk factors such as a transaction time and/or a number of transactions recently performed. For example, including such risk factors may result in the following formula:

$$L = A * \log_2(Nb) * R(T) * \log_{10}(TA) + B \qquad \text{[Math 5]}$$

where Nb represents the number of transactions performed during the last twenty-four hours with the same account number or the same bank card, T represents the transaction time and R (T) is a risk coefficient depending on the time T, the coefficient R (T) is for example read in a mapping table produced from statistics on the times when fraudulent transactions are made.

The debtor service server 4' then calculates the verification code AC during the fourth verification step 504 as described previously. The fifth and sixth verification steps 505 and 506 are then performed in parallel. The fifth verification step 505 consists in sending an outgoing message S1, via the first communication channel, to the first terminal 2, the outgoing message containing a request Req asking the user 1 of the first terminal 2 to return a verification code in a response form. The sixth verification step 506 consists in sending an outgoing message S2 via the second communication channel, to the second terminal 5, the second terminal 5 having been previously identified using the database of the debtor service server 4' in relation with the bank account or bank card to be debited. The outgoing message S2 contains the verification code AC calculated during the fourth verification step 504.

The fifth verification step 505 corresponds to a seventh step 407 of the transaction method. During the seventh step 407, the debtor service server 4' transfers an outgoing message containing the request S1 (Req) to the purchaser service server 7. The purchaser service server 7 transfers this message to the merchant site 6 during an eighth step 408 of the transaction method. The merchant site 6 then forwards the request to the first terminal 2 in a ninth step 409 of the transaction method.

The sixth verification step 506 corresponds to a tenth step 410 of the transaction method during which the second terminal 5 receives the verification code AC.

Once the request Req has been received by the first terminal 2, it is displayed to the user 1 during an eleventh step 411 of the transaction method, and the user 1 must fill in the response form. In parallel with the eleventh step 411, a twelfth step 412 of the transaction method consists in displaying the verification code AC on the second terminal 5 to the user 1.

The user 1, having the verification code AC, fills in the response form by copying the verification code AC into the response form during a thirteenth step 413 of the transaction method. The copied verification code AC' is sent to the merchant site 6 in a fourteenth step 414 of the transaction method. During a fifteenth step 415 of the transaction method, the merchant site 6 forwards the response form to the purchaser service server 7. In a sixteenth step 416 of the transaction method, the purchaser service server 7 sends the filled in form to the debtor service server 4'.

The sixteenth step 416 of the transaction method corresponds to the seventh verification step 507 performed by the debtor service server 4'. The debtor service server 4' receives an incoming message R1 arriving via the first channel containing the copied code AC'. During an eighth verification step 508, the debtor service server 4' compares the copied code AC' with the verification code AC calculated during the fourth verification step 504.

If the copied verification code AC' is identical to the verification code AC, the debtor service server 4' performs the ninth step 509 during which it validates and saves the execution of the transaction. Then, the tenth verification step 510 is performed to send an outgoing message S1 via the first communication channel to the first terminal 2 to indicate that the transaction has been performed.

If the copied verification code AC' is not identical to the verification code AC, the debtor service server 4' performs the eleventh step 511 during which it cancels the transaction. If, during the second verification step 502, the debtor service server 4' has found that the bank account or the bank card is blocked, or if other verifications have shown that some redundant information does not match that corresponding to the bank account or the bank card, the second verification step 502 can lead directly to the eleventh verification step 511 and also cancel the transaction. After the eleventh verification step 511, a twelfth verification step 512 is performed to send an outgoing message S1 via the first communication channel to the first terminal 2 to indicate that the transaction has been cancelled.

The tenth verification step 510 or the twelfth verification step 512 corresponds to a seventeenth step 417 of the transaction method in which the purchaser service server 7 receives the outgoing message S1. The purchaser service server 7 saves the execution or cancellation of the transaction and sends the outgoing message to the merchant site 6 during an eighteenth step 418 of the transaction method. The merchant site 6 finds that the transaction has been validated or cancelled. If the transaction is validated, the merchant site 6 delivers the service or triggers the delivery of the purchased product. During a nineteenth step 419, the merchant site 6 sends a message confirming or cancelling the transaction to the first terminal 2. The first terminal 2 displays the confirmation message to the user 1 during a twentieth step 420 of the transaction method. Thus, the user 1 is informed that the purchase has been executed or cancelled.

Numerous alternative embodiments are possible while remaining within the scope of the verification method according to the invention. For example, the seventh to ninth steps 407 to 409 of the transaction method described in relation to FIG. 4 can be replaced by a first alternative step 421 which sends the confirmation code request from the debtor service server 4' directly to the first terminal 2 via the open network 3. Also, a second alternative step 422 can replace the fourteenth to sixteenth steps 414 to 416 of the transaction method to send the copied verification code AC' from the first terminal 2 directly to the debtor service server 4'.

In this document, the first terminal 2 is a computer connected to the Internet and the second terminal 5 is a mobile phone. As indicated previously in the description, the first and second terminals 2 and 5 can be any type of connected device which can exchange data with a remote server. According to a variant, the first and second terminals 2 and 5 can be one and the same physical terminal. The most important is that the first and second communication channels should be at least logically distinct from each other so that malicious interception of the first channel does not automatically lead to malicious interception of the second channel.

For example, the first and second terminals can be one and the same personal computer with a first communication channel comprising Internet browsing software and a second communication channel comprising messaging software, the second communication channel being identified using an email address. In this example, the first and second communication channels are logically distinct from each other, although the physical connection of the terminals uses the same communication interface, in other words the same network connection board. However, the verification code sent by the second channel cannot be accessed directly by the navigation software and the user must use a human-machine interface of the personal computer to display and copy said code. Thus, only software that intercepts actions performed on the human-machine interface can intercept the verification code. However, this type of interception can also occur when the two communication channels are physically distinct and consequently the logical differentiation forms the same security level as a physical differentiation of the communication channels.

FIGS. 2 and 4 describe a debtor service server 4' and a purchaser service server 7. Typically, an electronic transaction is performed between two bank accounts belonging to two different holders who have two different banks, each with its own server. However, the vendor and the purchaser could each have a bank account in the same bank. In this case, the debtor 4' and purchaser 7 service servers are the same server, which reduces the number of exchanges.

Inversely, one or more intermediate service providers can also be inserted between the debtor 4' and purchaser 7 service servers. This is particularly the case when credit cards are used. The link is not made directly from bank to bank, but goes through a card provider which can replace the cardholder's bank or simply act as an intermediary during an online transaction.

Similarly, the banking 4, debtor 4' and purchaser 7 service servers can be distributed servers. In view of the volume of banking data and the number of transaction requests, several independent computers connected to a network can perform the role of each of the banking 4, debtor 4' and purchaser 7 service servers. Each computer forming one of the servers can perform all or some of the transaction operations, the various transaction operations being performed on different computers.

The invention claimed is:

1. A two-factor transaction authentication method using two data communication channels for a user using a first terminal connected to at least one bank transaction server, including a processing unit, via a first communication channel and a second terminal connected to the at least one bank transaction server via a second communication channel that is at least logically distinct from the first communication channel, the method comprising:
- a first step during which the first terminal sends transaction information for a transaction to the at least one bank transaction server comprising at least a transaction amount (TA), and an identification (ID) of a bank account and/or of a bank card to be debited,
- a second step during which the bank transaction server, via instructions executing on the processing unit, calculates a length (L) for a verification code (AC) depending on the transaction amount (TA), generates the verification code (AC) having a number of digits corresponding to the length (L) calculated by the bank transaction server, determines the second terminal according to the identification (ID) of the bank account and/or of the bank card to be debited, then sends, firstly, a confirmation request requesting the verification code to the first terminal via the first communication channel and, secondly, the verification code to the second terminal via the second communication channel,
- a third step during which the user copies the verification code (AC) received on the second terminal in the confirmation request received by the first terminal and returns said request thus filled in with the copied code (AC') to the bank transaction server using the first terminal via the first communication channel, and
- a fourth step during which the bank transaction server, via instructions executing on the processing unit, receives the copied code (AC') from the first terminal via the first communication channel and compares the verification code (AC) with the copied code (AC') and sends to the first terminal a transaction validation message, indicative of the transaction being executed, if the codes are identical or a transaction invalidation message, indicative of the transaction being cancelled, if the codes are different.

2. The method according to claim 1, wherein the transaction information further comprises account holder identification information and at least one redundant item of information relating to the identification of the bank account to be debited, wherein the second step comprises a preliminary step which checks that the identification of the bank account to be debited matches the holder identification information and the at least one redundant item of information and wherein the second step is only performed if the match is successful.

3. The method according to claim 1, wherein the length (L) of the verification code (AC) also depends on a risk factor determined using one or more parameters selected from a transaction time, a transaction date, information relating to a cardholder, a number of transactions performed during a predetermined period preceding the transaction.

4. The method according to claim 1, wherein the length (L) of the verification code (AC) increases when the transaction amount (TA) increases.

5. The method according to claim 1, wherein the length (L) of the verification code (AC) is between a minimum value and a maximum value.

6. The method according to claim 1, wherein the length (L) is calculated as a function of the transaction amount (TA), a parameter (A) indicative of a risk factor, and a parameter (B) indicative of a minimum number of digits for the length (L).

7. The method according to claim 6, wherein the length (L) is calculated by executing a formula in which $L=A*TA+B$ or $L=A*\log_{10}(TA)+B$.

8. The method according to claim 1, wherein the fourth step includes the bank transaction server executing the transaction if the codes are identical and cancelling the transaction if the code are different.

9. A bank transaction server, comprising:
- a processing unit,
- a non-transitory program memory,
- at least one communication interface capable of communicating via a first communication channel and via a second communication channel that is at least logically distinct from the first communication channel,
- the non-transitory program memory comprising instructions cooperating with the processing unit so that the server is configured to:
- after receiving from the first communication channel a transaction request comprising at least a transaction amount (TA) for a transaction and an identification (ID) of a bank account to be debited, calculate a length (L) of a verification code (AC) depending on the transaction amount (TA), generate the verification code (AC) using the length (L) calculated such that the verification code (AC) has a number of digits corresponding to the length (L), determine a second communication channel according to the identification (ID) of the bank account to be debited, send a confirmation request (Req) requesting the verification code via the first communication channel, and send the verification code (AC) via the second communication channel,
- after receiving a code (AC') received via the first communication channel in response to the confirmation request, compare said received code (AC') with the verification code (AC) and send via the first communication channel a transaction validation message if said codes are identical or a transaction invalidation message if said codes are different.

10. The server according to claim 9, wherein the length (L) is calculated as a function of the transaction amount (TA), a parameter (A) indicative of a risk factor, and a parameter (B) indicative of a minimum number of digits for the length (L).

11. The server according to claim 10, wherein the length (L) is calculated by executing a formula in which $L=A*TA+B$ or $L=A*\log_{10}(TA)+B$.

12. The server according to claim 9, wherein the bank transaction server, via the instructions cooperating with the processing unit, executes the transaction if the codes are identical and cancels the transaction if the code are different.

13. A bank transaction system, comprising:
- at least one bank transaction server including a processing unit,
- a first terminal of a user connected to the at least one bank transaction server via a first communication channel, and
- a second terminal of a bank account and/or bank card holder connected to the at least one bank transaction server via a second communication channel that is at least logically distinct from the first communication channel, the first terminal being configured to send, when requested by the user, to the at least one bank transaction server, a transaction request comprising at least a transaction amount (TA) for a transaction and an identification (ID) of the bank account and/or of the bank card, the bank transaction server being configured to, via instructions executing on the processing unit after receiving the transaction request, calculate a length (L) for a verification code (AC) depending on the transaction amount (TA), generate the verification code (AC) having a number of digits corresponding to the length (L) calculated by the bank transaction server, determine the second terminal according to the identification of the bank account to be debited, then send, firstly, a confirmation request requesting the verification code to the first terminal via the first communication channel and, secondly, the verification code to the second terminal via the second communication channel, the second terminal is configured to display, to the bank account holder, the verification code sent by the bank transaction server, the first terminal is configured to return to the bank transaction server a code (AC') copied by the user using the verification code (AC) displayed on the second terminal, and the bank transaction server is configured to, via instructions executing on the processing unit after receiving the copied code (AC'), compare the verification code (AC) with the copied code (AC') and send to the first terminal a transaction validation message if the codes are identical or send a transaction invalidation message if the codes are different.

14. The system according to claim 13, wherein the length (L) is calculated as a function of the transaction amount (TA), a parameter (A) indicative of a risk factor, and a parameter (B) indicative of a minimum number of digits for the length (L).

15. The system according to claim 14, wherein the length (L) is calculated by executing a formula in which $L=A*TA+B$ or $L=A*\log_{10}(TA)+B$.

16. The system according to claim 13, wherein the bank transaction server, via the instructions cooperating with the processing unit, executes the transaction if the codes are identical and cancels the transaction if the code are different.

* * * * *